United States Patent [19]
Bock et al.

[11] 3,991,054
[45] Nov. 9, 1976

[54] DISPERSE DYES BASED ON ISOINDOLENE DERIVATIVES

[75] Inventors: Gustav Bock, Neustadt; Wolfgang Elser, Frankenthal, both of Germany

[73] Assignee: BASF Aktiengesellschaft, Ludwigshafen (Rhine), Germany

[22] Filed: July 28, 1975

[21] Appl. No.: 599,610

Related U.S. Application Data

[60] Division of Ser. No. 448,947, March 7, 1974, Pat. No. 3,923,806, which is a continuation-in-part of Ser. No. 247,820, Aug. 29, 1972, abandoned.

[30] Foreign Application Priority Data

May 3, 1971   Germany............................ 2121524

[52] U.S. Cl............................... 260/256.4 C; 8/10; 260/302 F; 260/309.2; 260/310 R; 260/326.1; 260/257
[51] Int. Cl.²......................................... C07D 403/04
[58] Field of Search............................ 260/256.4 C

[56] References Cited
FOREIGN PATENTS OR APPLICATIONS
1,537,299   9/1967   France......................... 260/256.4 C Primary Examiner—Nicholas S. Rizzo
Assistant Examiner—James H. Turnipseed Attorney, Agent, or Firm—Johnston, Keil, Thompson & Shurtleff

[57] ABSTRACT

Disperse dyes for linear polyester fibers, said dyes having the formula:

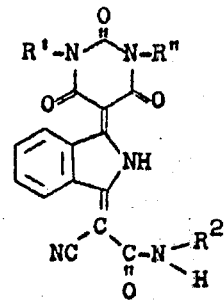

in which R' and R'' are alkyl of 1 to 5 carbon atoms, 2-chloroethyl, 2-cyanoethyl, 2-ethoxyethyl, 2-methoxyethyl, 3-methoxypropyl, 3-ethoxypropyl, 3-isopropoxypropyl, 2-phenylethyl, benzyl or phenyl and wherein R' and R'' are identical or different and $R^2$ is methyl, ethyl, propyl, butyl, 2-ethoxyethyl, 3-ethoxypropyl, 2-methoxyethyl, 3-methoxypropyl, 2-phenylethyl, phenyl, p-chlorophenyl, p-methylphenyl or hydrogen.

4 Claims, No Drawings

DISPERSE DYES BASED ON ISOINDOLENE DERIVATIVES

RELATED APPLICATIONS

This application is a division of our application Ser. No. 448,947, filed Mar. 7, 1974, now U.S. Pat. No. 3,923,806, which in turn is a continuation-in-part of our copending application Ser. No. 247,820, filed Apr. 26, 1972, now abandoned, the disclosure of which are incorporated herein by reference.

The invention relates to new disperse dyes based on 3-iminoisoindoline derivatives.

The invention relates to disperse dyes of the formula (I):

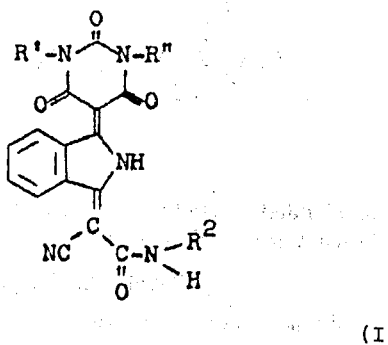

in which R' and R" are alkyl of 1 to 5 carbon atoms, 2-chloroethyl, 2-cyanoethyl, 2-ethoxyethyl, 2-methoxyethyl, 3-methoxypropyl, 3-ethoxypropyl, 3-isopropoxypropyl, 2-phenylethyl, benzyl or phenyl and wherein R' and R" are identical or different and $R^2$ is methyl, ethyl, propyl, butyl, 2-ethoxyethyl, 3-ethoxypropyl, 2-methoxyethyl, 3-methoxypropyl, 2-phenylethyl, phenyl, p-chlorophenyl, p-methylphenyl or hydrogen.

The new dyes dye linear aromatic polyester fibrous material brilliant greenish yellow to bluish red shades by the carrier and HT methods. The dyeings obtained on polyesters have very good tinctorial properties such as good fastness to light.

Examples of alkyl and substituted alkyl for R' and R" are: methyl, ethyl, n-propyl, isopropyl, n-butyl, isobutyl, amyl, isoamyl, 2-methoxyethyl, 2-ethoxyethyl, 2-n-propoxyethyl, 2-isopropoxyethyl, 2-n-butoxyethyl, 2-isobutoxyethyl, 3-methoxypropyl, 3-ethoxypropyl, 3-n-propoxypropyl, 3-isopropoxpropyl, 2-chloroethyl, 2-bromoethyl, 2-cyanoethyl, 2-carbomethoxyethyl, 2-carboethoxyethyl, 2-carbopropoxyethyl and 2-carbobutoxyethyl.

Examples of substituted phenyl or aralkyl are: 2-chlorophenyl, 3-chlorophenyl, 4-chlorophenyl, 2-bromophenyl, 3-bromophenyl, 4-bromophenyl, 2-methylphenyl, 3-methylphenyl, 4-methylphenyl, 2-ethylphenyl, 3-ethylphenyl, 4-ethylphenyl, 2-n-butylphenyl, 3-n-butylphenyl, 4-n-butylphenyl, 2-tert.-butylyphenyl, 3-tert.-butylphenyl, 4-tert.-butylphenyl, 2-methoxyphenyl, 3-methoxy-phenyl, 4-methoxyphenyl, 4-ethoxyphenyl, benzyl and β-phenylethyl.

Methyl, 2-chloroethyl, 2-methoxyethyl, 3-methoxypropyl, 3-ethoxypropyl, 3-isopropoxypropyl and 2-cyanoethyl are particularly preferred as substituents of R' and R".

Examples of $R^2$ are alkyl of one to four carbon atoms such as methyl, ethyl, butyl, 3-methoxypropyl, 3-ethoxypropyl, or β-hydroxyethyl, phenalkyl such as β-phenylethyl, benzyl or aryl such as phenyl. In the aforementioned compounds bearing the group $R^2$ those compounds wherein $R^2$ is methyl, ethyl, propyl, butyl, 2-ethoxyethyl, 3-ethoxypropyl, 2-methoxyethyl, 3-methoxypropyl, 2-phenylethyl, phenyl, p-chlorophenyl or p-methylphenyl are preferred.

Those dyes of the formula above in which R' and R" is methyl, 2-chloroethyl, 2-methoxyethyl, 3-methoxypropyl, 3-ethoxypropyl, 3-isopropoxypropyl or 2-cyanoethyl, $R^2$ is

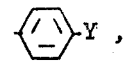

and Y is hydrogen, chlorine or methyl, R' and R" being identical or different, are particularly preferred because of the outstanding tinctorial properties.

The new dyes are obtained, by a method known per se, by condensation of a monosubstitution product of 3-iminoisoindoline of the general formula

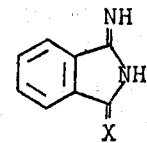

in which X has the meaning =C(CN)CONHR$^2$ with a derivative of barbituric acid of the general formula

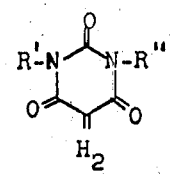

in which R has the above meanings in a solvent or diluent at elevated temperature.

The monosubstitution products of 3-iminoisoindoline of the general formula (II) are obtained by a conventional method by reaction of 3-imino-1-aminoisoindoline with a compound of the formula $CH_2(CN)CONHR^2$ in which $R^2$ has the above meanings in a solvent or diluent. Examples of compounds are cyanoacetamide, N-substituted cyanoacetamides such as N-methylcyanoacetamide, N-ethylcyanoacetamide, N-butylcyanoacetamide, N-(3-methoxypropyl)-cyanoacetamide, N-(β-phenylethyl)-cyanoacetamide, or cyanoacetanilide.

Barbituric acid derivatives of the general formula (III) include N-(2-chloroethyl)-N'-(3-methoxypropyl)-barbituric acid, N,N'-bis-(3-ethoxypropyl)-barbituric acid, N,N'-dimethylbarbituric acid, N-methyl-N'-(3-methoxypropyl)-barbituric acid, N,N'-bis-(3-methoxypropyl)-barbituric acid, N-methyl-N'-(3-ethoxypropyl)-barbituric acid, N-methyl-N'-(3-propoxypropyl)-barbituric acid, N-ethyl-N'-(3-ethoxypropyl)-barbituric acid, N-ethyl-N'-(3-methoxypropyl-barbituric acid, N-benzyl-N'-(3-methoxypropyl)-barbituric acid, N-methyl-N'-(2-methoxyethyl)-barbituric acid, N-ethyl-N'-(2-methoxyethyl)-barbituric acid and bis-(2-methoxyethyl)-barbituric acid.

Suitable solvents and diluents include polar organic solvents, especially those which are miscible in all proportions with water such as dimethylformamide, diethylformamide, diethylacetamide, dimethylacetamide, N-methylpyrrolidone, glacial acetic acid, formic acid, glycol monomethyl ether, glycol monoethyl ether or mixtures of the same. Mixtures of dimethylformamide and glacial acetic acid are particularly suitable as solvents or diluents. Condensation is advantageously carried out at a temperature within the range from 50° to 130° C.

The monosubstitution product (II) is heated with the barbituric acid derivative (III) in the solvent or diluent to effect condensation. After the reaction is over the dye may be precipitated, depending on its solubility in the reaction medium, for example by pouring the reaction mixture into water followed by suction filtration or isolated by direct suction filtration of the reaction mixture.

Mixtures of dyes consisting of two or more dyes may be prepared (instead of individual dyes) (a) by reacting a mixture of monosubstitution products of 3-iminoisoindoline (II) with a barbituric acid derivative (III), or (b) by reacting a single monosubstitution product of 3-iminoisoindoline (II) with a mixture of barbituric acid derivatives (III), or (c) by reacting a mixture of monosubstitution products of 3-iminoisoindolines (II) with a mixture of barbituric acid derivatives (III).

The new dyes, particularly those in which both substituents R' and R'' are alkyl, aryl and/or phenalkyl, and more particularly those in which both R's are alkyl are outstandingly suitable for dyeing linear aromatic polyester fibrous material from a dye liquor. Dyes in which both nitrogen atoms in the barbituric acid moiety bear hydrogen atoms, such as the dye described in Belgian Pat. No. 703,669 (obtained by reaction of 1-(cyanomethylenecarboxamido)-3-iminoindoline with barbituric acid) are not suitable for dyeing linear aromatic polyester material from a dye liquor because of their sparing solubility.

The following Examples illustrate the invention. The parts and percentages hereinafter given are by weight. The parts by volume specified bear the same relation to parts by weight as the liter to the kilogram.

EXAMPLE 1

10.6 parts of 1-(cyanocarboxamidomethylene)-3-iminoisoindoline and 14.4 parts of N-butyl-N'-(2-phenylethyl)-barbituric acid are stirred for 4 hours at 100° C in 200 parts of dimethylformamide and 50 parts of formic acid. 17 parts of the yellow dye of the formula:

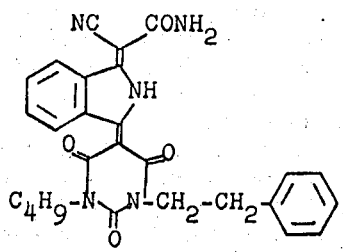

precipitates from the cooled reaction mixture. It dyes polyesters green yellow shades.

EXAMPLE 2

13.4 parts of 1-(cyano-(N-butylcarboxamido)-methylene)-3-iminoisoindoline and 16.2 parts of N-butyl-N'-(3-ethoxypropyl)-barbituric acid are stirred for one hour at 100° C in 100 parts of dimethylformamide and 10 parts of formic acid. Upon cooling, 16.7 parts of the dye of the formula:

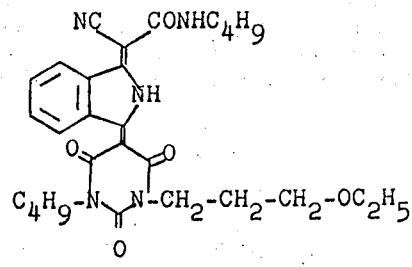

precipitates on cooling. The compound dyes polyesters brilliant green yellow shades.

EXAMPLES 3 to 29

3-iminoisoindoline derivatives of the formula (IIb):

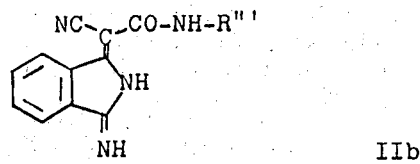

are reacted in the ratio 1:1 mole with barbituric acid derivatives of the formula (III):

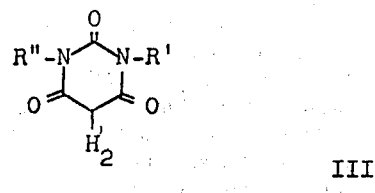

as described in Example 2; dyes of the formula (Ib)

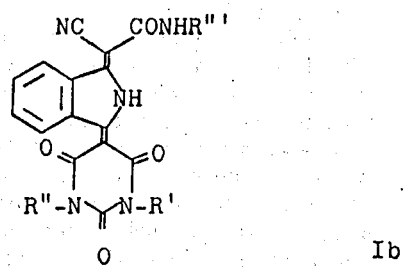

are obtained in which R', R'' and R''' have the meanings specified in the following table:

| Example | R' | R'' | R''' | Shade on polyester |
|---|---|---|---|---|
| 3 | CH₃— | —(CH₂)₃—OC₂H₅ | C₂H₅— | green yellow |
| 4 | CH₃— | —(CH₂)₂—OC₂H₅ | C₂H₅— | green yellow |
| 5 | CH₃— | —(CH₂)₃—OC₂H₅ | —(CH₂)₃—OC₂H₅ | yellow |
| 6 | CH₃— | —(CH₂)₃—OC₂H₅ | n-C₄H₉— | yellow |
| 7 | CH₃— | —(CH₂)₃—OC₂H₅ | —CH₂—CH₂—C₆H₅ | green yellow |
| 8 | CH₃— | n-C₄H₉— | C₂H₅— | yellow |
| 9 | CH₃— | n-C₄H₉— | —CH₂—CH₂—OH | yellow |
| 10 | CH₃— | n-C₄H₉— | n-C₄H₉— | yellow |
| 11 | CH₃— | n-C₄H₉— | —CH₂—CH₂—C₆H₅ | yellow |
| 12 | CH₃— | n-C₄H₉— | —(CH₂)₃—OC₂H₅ | yellow |
| 13 | n-C₄H₉— | —(CH₂)₃—OC₂H₅ | —(CH₂)₃—OC₂H₅ | yellow |
| 14 | n-C₄H₉— | —(CH₂)₃—OC₂H₅ | C₄H₉— | green yellow |
| 15 | n-C₄H₉— | —(CH₂)₃—OC₂H₅ | C₂H₅— | yellow |
| 16 | n-C₄H₉— | —(CH₂)₃OC₂H₅ | —CH₂—CH₂—OH | yellow |
| 17 | CH₃— | —CH₃ | —(CH₂)₃—OC₂H₅ | green yellow |
| 18 | CH₃— | —CH₃ | —(CH₂)₃—OC₂H₅ | green yellow |
| 19 | CH₃— | —CH₃ | n-C₄H₉— | green yellow |
| 20 | n-C₄H₉— | n-C₄H₉— | n-C₄H₉— | green yellow |
| 21 | n-C₄H₉— | n-C₄H₉— | —(CH₂)₃—OC₂H₅ | green yellow |
| 22 | n-C₄H₉ | —CH₂—CH₂—C₆H₅ | —(CH₂)₃—OC₂H₅ | green yellow |
| 23 | n-C₄H₉ | —CH₂—CH₂—C₆H₅ | —C₂H₅ | yellow |
| 24 | C₆H₅—CH₂— | —(CH₂)₃—OC₂H₅ | —(CH₂)₃—OC₂H₅ | yellow |
| 25 | C₆H₅—CH₂— | —(CH₂)₃—OC₂H₅ | —C₂H₅ | yellow |
| 26 | C₆H₅— | —(CH₂)₃—OC₂H₅ | —C₂H₅ | yellow |
| 27 | C₆H₅— | —(CH₂)₃—OC₂H₅ | —C₄H₉ | yellow |
| 28 | CH₃— | —CH₂—CH₂—OCH₃ | —C₂H₅ | yellow |
| 29 | C₂H₅— | —CH₂—CH₂—OCH₃ | —C₂H₅ | yellow |

EXAMPLE 30

14.4 parts of 1-(cyanocarboxanilidomethylene)-3-iminoisoindoline and 11.4 parts of N-methyl-N'-(3-ethoxypropyl)-barbituric acid are stirred for three hours at 100° C in 100 parts of dimethylformamide and 15 parts of formic acid. 16.1 parts of the dye of the formula:

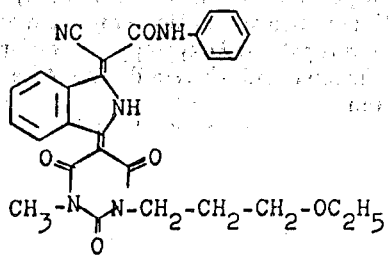

precipitates on cooling. It dyes polyester fibers reddish yellow shades of excellent fastness properties.

EXAMPLES 31–39

3-iminoisoindoline derivatives of the formula (IIc)

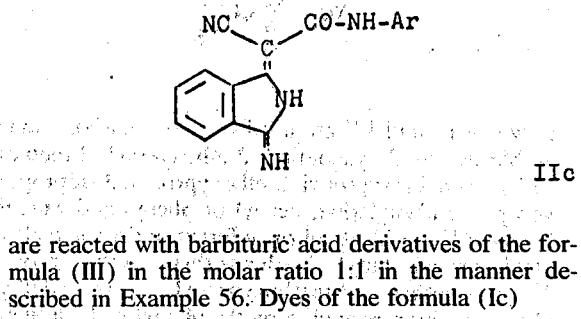

are reacted with barbituric acid derivatives of the formula (III) in the molar ratio 1:1 in the manner described in Example 56. Dyes of the formula (Ic)

are obtained in which Ar, R' and R'' have the meanings given in the following Table.

| Example | R' | R'' | Ar | Dyeing on polyester |
|---|---|---|---|---|
| 31 | H— | —CH₃ | phenyl | yellow |
| 32 | phenyl | —(CH₂)₃—OC₂H₅ | phenyl | yellow |
| 33 | benzyl (—CH₂—phenyl) | —(CH₂)₃—OC₂H₅ | phenyl | yellow |
| 34 | C₂H₅— | —CH₂—CH₂—CN | phenyl | yellow |
| 35 | C₄H₉— | —CH₂—CH₂—phenyl | phenyl | yellow |
| 36 | CH₃— | —C₄H₉ | phenyl | yellow |
| 37 | CH₃— | —(CH₂)₃—OC₂H₅ | Cl—phenyl | yellow |
| 38 | CH₃— | —(CH₂)₃—OC₂H₅ | CH₃—phenyl | yellow |
| 39 | CH₃— | —CH₂—CH₂—OCH₃ | phenyl | yellow |

We claim:
1. A disperse dye of the formula

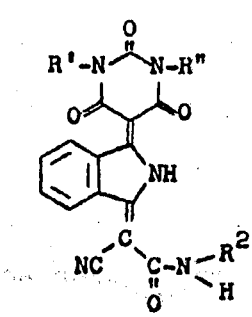

in which R' and R'' are alkyl of 1 to 5 carbon atoms, 2-chloroethyl, 2-cyanoethyl, 2-ethoxyethyl, 2-methoxyethyl, 3-methoxypropyl, 3-ethoxypropyl, 3-isopropoxypropyl, 2-phenylethyl, benzyl or phenyl and wherein R' and R'' are identical or different and R² is methyl, ethyl, propyl, butyl, 2-ethoxyethyl, 3-ethoxypropyl, 2-methoxyethyl, 3-methoxypropyl, 2-phenylethyl, phenyl, p-chlorophenyl, p-methylphenyl or hydrogen.

2. A disperse dye as claimed in claim 1 wherein R' and R'' are methyl, 2-chloroethyl, 2-methoxyethyl, 3-methoxypropyl, 3-ethoxypropyl, 3-isopropoxypropyl or 2-cyanoethyl, and wherein R' and R'' are identical or different.

3. A disperse dye of the formula

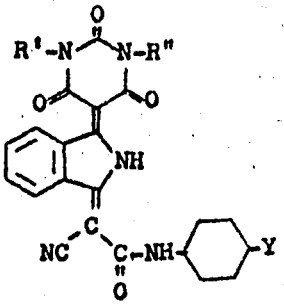

wherein R' and R'' are alkyl of 1 to 5 carbon atoms, 2-chloroethyl, 2-cyanoethyl, 2-ethoxyethyl, 3-methoxypropyl, 2-methoxyethyl, 3-ethoxypropyl, 3-isopropoxypropyl, 2-phenylethyl, benzyl, or phenyl and wherein R' and R'' are identical or different, and Y is hydrogen, chloro or methyl.

4. A disperse dye as claimed in claim 3, wherein R' and R'' are methyl, 2-chloroethyl, 2-methoxyethyl, 3-methoxypropyl, 3-ethoxypropyl, 3-isopropoxypropyl or 2-cyanoethyl, and wherein R' and R'' are identical or different.

* * * * *